United States Patent
Eden et al.

(10) Patent No.: US 11,492,271 B2
(45) Date of Patent: Nov. 8, 2022

(54) SYSTEMS AND METHODS FOR REMOVING AMMONIA FROM AN AMMONIA-CONTAINING LIQUID

(71) Applicant: Process Limited, Coventry (GB)

(72) Inventors: Robert Eden, Coventry (GB); Mark Moulden, Coventry (GB)

(73) Assignee: PROCESS LIMITED, Coventry (GB)

( * ) Notice: Subject to any disclaimer, the term of this patent is extended or adjusted under 35 U.S.C. 154(b) by 18 days.

(21) Appl. No.: 17/269,812

(22) PCT Filed: Jun. 28, 2019

(86) PCT No.: PCT/GB2019/051840
§ 371 (c)(1),
(2) Date: Feb. 19, 2021

(87) PCT Pub. No.: WO2020/039160
PCT Pub. Date: Feb. 27, 2020

(65) Prior Publication Data
US 2021/0238058 A1 Aug. 5, 2021

(30) Foreign Application Priority Data

Aug. 21, 2018 (GB) .................................... 1813619

(51) Int. Cl.
*C02F 1/20* (2006.01)
*B01D 3/34* (2006.01)
(Continued)

(52) U.S. Cl.
CPC ................ *C02F 1/20* (2013.01); *B01D 3/346* (2013.01); *B01D 5/006* (2013.01); *B01D 19/001* (2013.01);
(Continued)

(58) Field of Classification Search
USPC ......................................................... 210/750
See application file for complete search history.

(56) References Cited

U.S. PATENT DOCUMENTS 3,920,419 A * 11/1975 Schroeder ................. C01C 1/10
95/263
4,104,038 A * 8/1978 Josis ........................ B01D 3/18
95/263
(Continued)

FOREIGN PATENT DOCUMENTS

CN 107697969 A 2/2018
DE 102010017334 A1 12/2011
(Continued)

OTHER PUBLICATIONS

PCT Notification of Transmittal of the International Preliminary Reporton Patentability; dated Nov. 19, 2020; International application No. PCT/GB2019/051840.
(Continued)

*Primary Examiner* — Nina Bhat
(74) *Attorney, Agent, or Firm* — Flener IP & Business Law; Zareefa B. Flener

(57) ABSTRACT

A system and method for removing ammonia from an ammonia-containing liquid is described. The system comprises a primary heat exchanger 12 for heating the ammonia-containing liquid to operational temperature, an ammonia stripper 14 for stripping ammonia from the ammonia-containing liquid from the primary heat exchanger and discharging it as ammonia-containing gas, and an acid scrubber 16 for reacting the ammonia in the ammonia-containing gas with acid to form an ammonium salt. The acid scrubber comprises a scrubbed air outlet 32 in fluid communication with a hot air inlet 20 of the ammonia stripper, such that scrubbed air which is discharged from the acid scrubber may be recycled for use in the ammonia stripper. Also described
(Continued)

is a system and method for removing ammonia from an ammonia-containing liquid, wherein the system comprises a cold-water scrubber for removing ammonia from the ammonia-containing gas discharged from the ammonia stripper.

9 Claims, 2 Drawing Sheets

(51) Int. Cl.
| | |
|---|---|
| *B01D 53/14* | (2006.01) |
| *B01D 5/00* | (2006.01) |
| *B01D 19/00* | (2006.01) |
| *C01C 1/10* | (2006.01) |
| *C02F 1/02* | (2006.01) |
| *C02F 101/16* | (2006.01) |
| *C02F 103/06* | (2006.01) |
| *C02F 103/36* | (2006.01) |

(52) U.S. Cl.
CPC .............. *B01D 53/145* (2013.01); *C01C 1/10* (2013.01); *C02F 1/02* (2013.01); *B01D 2251/50* (2013.01); *B01D 2252/103* (2013.01); *B01D 2257/406* (2013.01); *C02F 2101/16* (2013.01); *C02F 2103/06* (2013.01); *C02F 2103/365* (2013.01); *C02F 2303/10* (2013.01)

(56) References Cited

U.S. PATENT DOCUMENTS

| | | | |
|---|---|---|---|
| 4,140,586 A | | 2/1979 | Kwasnoski et al. |
| 4,311,597 A | * | 1/1982 | Bhattacharyya ...... C02F 3/1231 203/79 |
| 4,522,638 A | * | 6/1985 | Karwat .............. B01D 53/1412 423/313 |
| 5,122,165 A | * | 6/1992 | Wang ................. B01D 19/0005 95/263 |
| 5,451,300 A | * | 9/1995 | Matros .................. B01J 8/0285 202/160 |
| 5,635,077 A | * | 6/1997 | Stultz ...................... C02F 1/586 210/903 |
| 6,692,642 B2 | | 2/2004 | Josse et al. |
| 6,998,098 B2 | * | 2/2006 | Allison ................. C10K 1/003 423/220 |
| 7,927,513 B1 | * | 4/2011 | Hickey .................. C10K 1/102 423/236 |
| 8,394,177 B2 | * | 3/2013 | Campbell .............. B01D 53/84 95/139 |
| 8,939,676 B2 | * | 1/2015 | Eden ........................ C02F 1/20 405/129.95 |
| 9,108,164 B2 | * | 8/2015 | Meessen ............. B01D 61/422 |
| 2011/0083556 A1 | * | 4/2011 | Duesel, Jr. .............. C02F 1/048 95/158 |
| 2011/0091369 A1 | * | 4/2011 | Casara .................. B01D 61/44 204/627 |
| 2011/0097257 A1 | * | 4/2011 | Sato ....................... B01D 53/52 422/256 |
| 2011/0281318 A1 | * | 11/2011 | Schreuder .............. C10K 1/102 252/372 |
| 2014/0033776 A1 | * | 2/2014 | Josse ....................... C05F 17/15 71/10 |
| 2014/0263100 A1 | * | 9/2014 | Kumar .................... C05F 17/40 210/770 |
| 2014/0363344 A1 | * | 12/2014 | Orentlicher ............ C01C 1/242 422/148 |
| 2019/0367382 A1 | * | 12/2019 | Rapport .................. C02F 1/041 |

FOREIGN PATENT DOCUMENTS

| | | |
|---|---|---|
| EP | 0029536 A1 | 6/1981 |
| EP | 2319805 B1 | 5/2011 |
| ES | 2304299 A1 | 10/2008 |
| FR | 2988304 A | 9/2013 |
| WO | 2006/005733 A1 | 1/2006 |
| WO | 2011/018269 A1 | 2/2011 |
| WO | 2013/091094 A1 | 6/2013 |
| WO | 2014/094162 A1 | 6/2014 |

OTHER PUBLICATIONS

PCT Notification of Transmittal of the International Search Report and The Written Opinion of the International Searching Authority, or the Declaration; dated Nov. 11, 2019; International application No. PCT/GB2019/051840.

United Kingdom Intellectual Property Office Search Report; Application No. GB1813619.2; dated Jun. 4, 2019.

United Kingdom Intellectual Property Office Search Report; Application No. GB1813619.2; dated Dec. 2, 2019.

\* cited by examiner

SYSTEMS AND METHODS FOR REMOVING AMMONIA FROM AN AMMONIA-CONTAINING LIQUID

The present invention relates to systems and methods for removing ammonia from an ammonia-containing liquid, such as landfill leachate, effluent from anaerobic digesters, and in petrochemical applications.

Ammonia-containing liquids such as for example landfill leachate and effluent from anaerobic digesters must be made safe for discharge, and it is necessary to remove ammonia to requisite discharge standards.

There are two principal known methods of stripping ammonia as a gas from liquid: the first is a chemical process that involves increasing the pH of the liquid, and the second is a thermal method that uses heat only. Both methods break the ionic bond that holds ammonia as $NH_4^+$ and converts the ammonia to $NH_3$, the free form. In large installations the chemical method is often used because the energy requirement for the thermal stripping of ammonia is prohibitive, and the cost of producing the necessary heat generally makes it economically unviable.

International patent publication WO 2012/110760 discloses a system for removing ammonia from landfill leachate which comprises an ammonia stripper for removing the ammonia from the leachate as an ammonia-containing gas, followed by decomposition of the ammonia in a thermal destructor. The thermal destructor can use heat from burning landfill gas, such as methane.

A disadvantage of the thermal decomposition of ammonia in a thermal destructor is that it requires combustion, which may not be possible in certain locations or jurisdictions. A further disadvantage of thermal decomposition of ammonia is the amount of heat energy which is required.

The present invention seeks to provide improved systems and methods for removing ammonia from liquid streams, such as landfill leachate, effluent from anaerobic digesters and in petrochemical applications.

Thus, according to the present invention in a first aspect there is provided a system for removing ammonia from an ammonia-containing liquid, which system comprises:

a primary heat exchanger for heating the ammonia-containing liquid to operational temperature;

an ammonia stripper for stripping ammonia from the ammonia-containing liquid from the primary heat exchanger and discharging it as ammonia-containing gas, the ammonia stripper comprising an ammonia-containing liquid inlet, a hot air inlet, an ammonia-containing gas outlet, and a liquid discharge outlet; and an acid scrubber for reacting the ammonia in the ammonia-containing gas discharged from the ammonia stripper with acid to form an ammonium salt, the acid scrubber comprising an ammonia-containing gas inlet, an acid inlet, a salt removal outlet and a scrubbed air outlet;

wherein the scrubbed air outlet is in fluid communication with the hot air inlet of the ammonia stripper, such that scrubbed air which is discharged from the acid scrubber may be recycled for use in the ammonia stripper.

The system of the present invention thus uses an acid scrubber to remove ammonia stripped from the ammonia-containing liquid. This has a number of advantages.

Thus, the use of an acid scrubber avoids issues regarding the use of hot gas exhausts as discussed above with reference to the prior art. Also, the reaction of ammonia with acid is exothermic, meaning that the scrubbed air which is discharged from the acid scrubber is hot, and can be recycled for use in the ammonia stripper. Unlike ammonia stripping systems which require heaters and/or boilers to generate hot air saturated with steam for use in the ammonia stripper, the system of the present invention may not require any additional heating or steam generation in this connection, since the scrubbed air discharged from the acid scrubber is already hot and saturated. Furthermore, the use of an acid scrubber produces an ammonium salt, which may be a valuable product in itself.

The system of the first aspect of the present invention may potentially be used to remove ammonia from any ammonia-containing liquid, such as landfill leachate, anaerobic digesters and in petrochemical applications.

The system of the first aspect of the present invention comprises a primary heat exchanger for heating the ammonia-containing liquid to operational temperature (i.e. the temperature at which the ammonia-containing liquid enters the ammonia stripper). This temperature is typically from 70 to 90° C., for example 72 to 85° C.

The ammonia-containing liquid heated to operational temperature by the primary heat exchanger passes into the ammonia stripper. The ammonia stripper comprises an ammonia-containing liquid inlet, a hot air inlet, an ammonia-containing gas outlet, and a liquid discharge outlet, and may be based upon a conventional ammonia stripper, for example as described in WO 2012/110760 referred to above.

Thus, the ammonia-containing liquid inlet is typically positioned at the upper end of the ammonia stripper through which ammonia-containing liquid is introduced. The hot air inlet is typically positioned at the lower end of the ammonia stripper, through which hot air enters the stripper and is forced in an upwardly direction, for example by a blower. The ammonia stripper will typically comprise one or more packed beds positioned between the ammonia-containing liquid inlet and the hot air inlet. In use, the ammonia-containing liquid typically flows in a generally downwardly direction under the influence of gravity, and hot, saturated air is forced upwards, removing ammonia from the ammonia-containing liquid as they mix within the stripper. The packed beds ensure that a large surface area of ammonia-containing liquid is exposed to the hot air. The ammonia is released from the liquid in the stripper as ammonia, mixes with the air, and passes out of the stripper through the ammonia-containing gas outlet for scrubbing in the acid scrubber. The liquid discharge outlet is typically at the bottom of the stripper, through which the treated liquid exits the stripper. The ammonia stripper may comprise more than one packed bed, and each packed bed may have an associated liquid distributor, to evenly distribute liquid over the surface of the packed bed. The packed beds may be randomly packed beds comprising any suitable packing material, for example pall rings.

As discussed above, an advantage of the system of the present invention is that the scrubbed air discharged from the acid scrubber is hot and saturated, and may be recycled for use in the ammonia stripper without further heating or saturation with steam. However, additional heating and saturation of air for use in the ammonia stripper may be used if necessary, for example at start-up of the system, for example from a boiler. An alternative/additional forced air source may also be used if necessary. The temperature of the hot air entering the ammonia stripper is preferably in the range 75 to 90° C.

The system of the first aspect of the present invention further comprises an acid scrubber for reacting the ammonia in the ammonia-containing gas discharged from the ammonia stripper with acid to form an ammonium salt, the acid scrubber comprising an ammonia-containing gas inlet, an acid inlet, a salt removal outlet and a scrubbed air outlet.

The acid scrubber used in the system of the first aspect of the present invention may be a standard packed column scrubber. The ammonia-containing gas inlet is preferably positioned at the lower end of the scrubber, and the acid inlet positioned at the upper end of the scrubber, with the gas and acid passing counter-currently to each other within the scrubber. The reaction of the acid with the ammonia forms an ammonium salt which is removed through the salt removal outlet, typically at the base of the scrubber. The acid may be any suitable acid, for example sulphuric, nitric or phosphoric, forming the corresponding salt, i.e. ammonium sulphate, nitrate or phosphate respectively. The reaction between the acid and the ammonia is exothermic, and the scrubbed air which is discharged from the scrubber via the scrubbed air outlet, typically at the top of the scrubber, is thus hot and is recycled for use in the ammonia stripper.

The water used in the scrubber is preferably recirculated through the acid scrubber for reuse, which may comprise a heat exchanger through which the water passes during recirculation, to control the temperature of the water reentering the scrubber.

The system of the first aspect of the present invention may comprise a further heat exchanger positioned within the flowpath of the scrubbed air between the scrubbed air outlet of the acid scrubber and hot air inlet of the ammonia stripper to control the temperature of the scrubbed air entering the ammonia stripper.

The system of the first aspect of the present invention may further comprise a condenser, for recovering heat from the hot ammonia-containing gas leaving the ammonia stripper to further heat incoming ammonia-containing liquid which is entering the system. The condenser may preferably be positioned upstream of the primary heat exchanger in the incoming ammonia-containing liquid flowpath.

The system of the first aspect of the present invention may further comprise an inlet counterflow heat exchanger for recovering heat from liquid which is being discharged from the system to heat incoming ammonia-containing liquid which is entering the system. Thus, for example, treated liquid which has had ammonia removed in the ammonia stripper is at elevated temperature when discharged from the ammonia stripper, and may pass through the inlet counterflow heat exchanger such that heat from the exiting liquid can be recovered to heat ammonia-containing liquid which is entering the system. In embodiments of the invention, the liquid discharge outlet of the ammonia stripper is thus in fluid communication with an inlet counterflow heat exchanger.

Treated liquid discharged from the ammonia stripper, optionally passing through an inlet counterflow heat exchanger, exits the system for disposal as waste. The treated waste liquid exiting the system may require additional treatment before disposal. Thus, the system of the present invention may comprise one or more further heat exchangers in the waste liquid exit flowpath, downstream of the liquid discharge outlet of the ammonia stripper, for cooling the waste liquid to ambient temperatures. For example, a refrigerant cooled heat exchanger may be used to control the exit temperature of the waste liquid.

The waste liquid exiting the system may be further treated prior to disposal. The system of the present invention may thus further comprise treatment means for treating waste liquid prior to discharge, for example a membrane bioreactor (MBR). MBRs are known in the art, and combine a membrane process, such as microfiltration or ultrafiltration, with a biological wastewater treatment process, typically the activated sludge process. MBR effluent is typically of sufficiently high quality for discharge in coastal, surface or brackish waterways.

According to the present invention in a second aspect there is provided a method of removing ammonia from an ammonia-containing liquid, which method comprises;

stripping ammonia from the ammonia-containing liquid in an ammonia stripper using hot air, and discharging it as ammonia-containing gas;

passing the ammonia-containing gas into an acid scrubber and reacting the ammonia in the ammonia-containing gas with acid to form an ammonium salt; and recycling scrubbed air which is discharged from the acid scrubber into the ammonia.

The method of the second aspect of the present invention is preferably performed using a system according to the first aspect of the present invention.

As an alternative to using an acid scrubber, as in the system and method of the first and second aspects of the present invention, ammonia may be removed from the ammonia-containing gas discharged from the ammonia stripper using a cold-water scrubber.

Thus, according to a third aspect of the present invention there is provided a system for removing ammonia from an ammonia-containing liquid, which system comprises:

a primary heat exchanger for heating the ammonia-containing liquid to operational temperature;

an ammonia stripper for stripping ammonia from the ammonia-containing liquid from the primary heat exchanger and discharging it as ammonia-containing gas, the ammonia stripper comprising an ammonia-containing liquid inlet, a hot air inlet, an ammonia-containing gas outlet, and a liquid discharge outlet; and a cold-water scrubber for removing ammonia from the ammonia-containing gas discharged from the ammonia stripper.

The cold-water scrubber typically removes the ammonia from the ammonia-containing gas as a solution of ammonia and water. Ammonia may then be removed from the ammonia-water solution, and the water recovered and recycled for reuse in the cold-water scrubber. The ammonia removal process may involve compressing the ammonia-water solution, heating the same to drive off ammonia gas, and condensing the ammonia gas as a liquid. The water may be recovered, cooled and reused.

Unlike the system and method of the first and second aspects of the present invention respectively, the system of the third aspect of the present invention does not use an exothermic reaction to remove ammonia from the ammonia-containing gas, and thus the ammonia stripper of the system of the third aspect of the invention will require additional means for heating and saturating air for use in the ammonia stripper. For example, the system of the third aspect of the present invention may comprise a boiler for generating steam to heat and saturate air for use in the ammonia stripper, and/or a forced air source.

The system of the third aspect of the present invention may employ any of the features of the system of the first aspect of the present invention as described herein, either individually or in any combination, as appropriate.

According to a fourth aspect of the present invention there is provided a method of removing ammonia from an ammonia-containing liquid, which method comprises;

stripping ammonia from the ammonia-containing liquid in an ammonia stripper using hot air, and discharging it as ammonia-containing gas;

passing the ammonia-containing gas into a cold-water scrubber to remove ammonia from the ammonia-containing gas.

The method of the fourth aspect of the present invention is preferably performed using a system according to the third aspect of the present invention.

BRIEF DESCRIPTION OF THE DRAWINGS

The present invention will now be described in detail with reference to the accompanying drawings in which.

Figure 1:
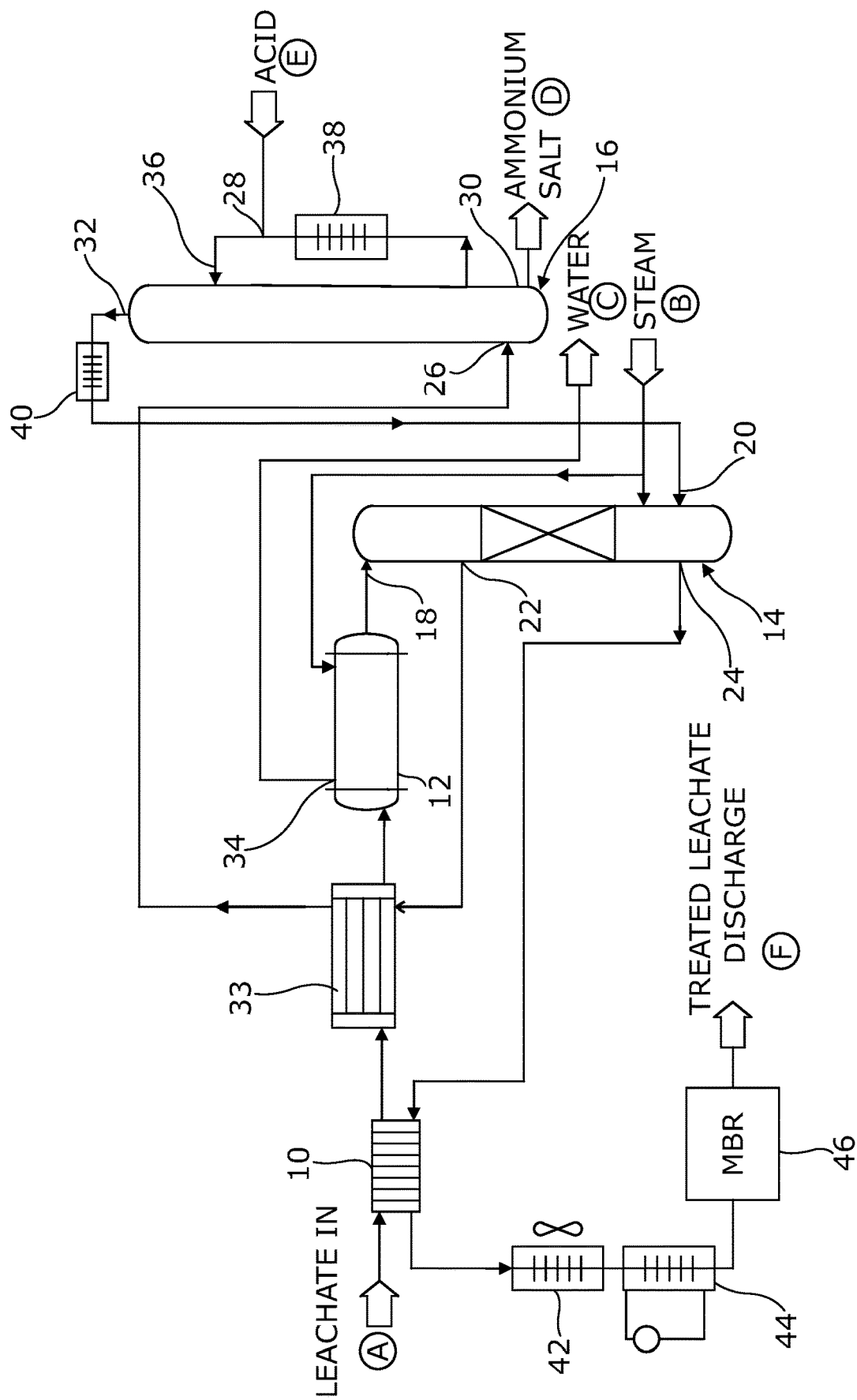
FIG. 1 shows a process flow diagram for the system and method of the first and second aspects of the present invention.

Thus, referring to FIG. 1, an embodiment of a system for removing ammonia from an ammonia-containing liquid is shown. The system and method of the present invention are discussed with reference to the embodiment shown in FIG. 1 in connection with the removal of ammonia from landfill leachate, but as discussed above the system and method of the present invention may potentially be used to remove ammonia from any ammonia-containing liquid, including landfill leachate, effluent from anaerobic digesters, and in petrochemical applications.

The embodiment of the system shown in FIG. 1 comprises an inlet counterflow heat exchanger 10, a primary heat exchanger 12, an ammonia stripper 14 and an acid scrubber 16. The ammonia stripper 14 comprises an ammonia-containing liquid inlet 18, a hot air inlet 20, an ammonia-containing gas outlet 22, and a liquid discharge outlet 24. The acid scrubber 16 comprises an ammonia-containing gas inlet 26, an acid inlet 28, a salt removal outlet 30 and a scrubbed air outlet 32. The acid inlet 28 connects to the water recirculation line before water inlet 36 and after the heat exchanger 38, so that acid is dosed into the circulating water.

Ammonia-containing landfill leachate enters the system as indicated by arrow A, and passes through the inlet counterflow heat exchanger 10. The inlet counterflow heat exchanger 10 recovers heat from treated leachate discharged from the ammonia stripper 14 via the liquid discharge outlet 24. The treated leachate discharged from the ammonia stripper 14 is at above ambient temperature, and heat in the leachate can be recovered to preheat leachate entering the system.

The embodiment of the system of the present invention shown in FIG. 1 also comprises a condenser 33 for recovering heat from hot ammonia-containing gas leaving the ammonia stripper 14 via the ammonia-containing gas outlet 22. The condenser 33 is positioned in the leachate flowpath between the inlet counterflow 10 and primary 12 heat exchangers. The condenser 33 can remove heat from the ammonia-containing gas prior to it entering the acid scrubber 18, and use it to further preheat the leachate entering the system.

The preheated leachate then passes from the condenser 33 into the primary heat exchanger 12, which heats the leachate to operational temperature for the ammonia stripper 14. This temperature is typically from 70 to 90° C., for example 72 to 85° C. The primary heat exchanger 12 may use steam to heat the leachate to operational temperature, as indicated by arrow B. The heating of leachate in heat exchanger 12 may be achieved by a hot water circuit, for example from a waste heat recovery loop (not shown). The steam may also be used in the ammonia stripper 14 if necessary, for example on system start-up. Condensed water may be discharged from the primary heat exchanger 12 through condensed water outlet 34, as indicated by arrow C.

The leachate heated to operational temperature then enters the ammonia stripper 14 through the ammonia-containing liquid inlet 18 positioned at the upper end of the ammonia stripper 14. Hot air enters the ammonia stripper 14 via the hot air inlet 20 positioned at the lower end of the ammonia stripper 14, and is forced in an upwardly direction, for example by a blower (not shown). The ammonia stripper 14 comprises one or more packed beds (not shown) positioned between the ammonia-containing liquid inlet 18 and the hot air inlet 20. The leachate flows in a generally downwardly direction under the influence of gravity, and the hot air is forced upwards, removing ammonia from the leachate as they mix within the stripper 14. The packed beds ensure that a large surface area of leachate is exposed to the hot air. The ammonia is released from the leachate in the stripper 14, and passes out of the stripper 14 through the ammonia-containing gas outlet 22 for scrubbing in the acid scrubber 16. The liquid discharge outlet 24 is at the bottom of the stripper 14, through which the treated leachate exits the stripper 14. The ammonia stripper 14 may comprise more than one packed bed, and each packed bed may have an associated liquid distributor (not shown), to evenly distribute leachate over the surface of the packed bed. The packed beds may comprise any suitable packing material, for example pall rings.

As discussed above, an advantage of the system of the present invention is that the scrubbed air discharged from the acid scrubber 16 via the scrubbed air outlet 32 is hot, and is recycled for use in the ammonia stripper 14 without further heating or saturation with steam. However, additional steam may be provided if necessary, for example from a boiler (not shown), as indicated by arrow B. The temperature of the hot air entering the ammonia stripper 14 is preferably in the range 75 to 90° C.

The ammonia-containing gas exits the ammonia stripper 14, passes through condenser 33 as described above, and into the acid scrubber 16 via the ammonia-containing gas inlet 26. In the acid scrubber 16 the ammonia in the ammonia-containing gas is reacted with acid to form an ammonium salt, which is removed via the salt removal outlet 30 located at the base of the stripper 16, as indicated by arrow D.

In the embodiment of the system of the present invention shown in FIG. 1, the acid scrubber 16 is a standard packed column scrubber. The ammonia-containing gas inlet 26 is positioned at the lower end of the scrubber 16, and the acid inlet 28 is positioned at the upper end of the scrubber 16, as indicated by arrow E, with the gas and acid passing countercurrently to each other within the scrubber 16. The acid may be any suitable acid, for example sulphuric, nitric or phosphoric, forming the corresponding salt, i.e. ammonium sulphate, nitrate or phosphate respectively. The reaction between the acid and the ammonia is exothermic, and the scrubbed air which is discharged from the scrubber 16 via the scrubbed air outlet 32 located at the top of the scrubber 16, is thus hot and is recycled for use in the ammonia stripper 14 as shown.

In this embodiment, the water is recirculated through the acid scrubber 16 for reuse and passes through a heat exchanger 38 during recirculation, to control the temperature of the water reentering the scrubber, via recirculated water inlet 36.

The system of this embodiment also comprises a further heat exchanger 40 positioned within the flowpath of the scrubbed air between the scrubbed air outlet 32 of the acid scrubber 16 and hot air inlet 20 of the ammonia stripper 14 to control the temperature of the scrubbed air entering the ammonia stripper 14.

Treated leachate discharged from the ammonia stripper 14 via the liquid discharge outlet 24, passes through the inlet counterflow heat exchanger 10 as described above, and then exits the system for disposal as waste. The treated leachate exiting the system may require additional treatment before disposal. Thus, the system shown in FIG. 1 comprises further heat exchangers 42 and in the leachate exit flowpath, downstream of the inlet counterflow heat exchanger 10, for cooling the leachate to ambient temperatures. Heat exchanger 44 is a refrigerant cooled heat exchanger to control the exit temperature of the leachate.

The leachate exiting the system may be further treated prior to disposal. The system shown in FIG. 1 thus further comprises a membrane bioreactor (MBR). MBRs are known in the art, and combine a membrane process, such as microfiltration or ultrafiltration, with a biological wastewater treatment process, typically the activated sludge process. The treated leachate exiting the system via the MBR 46 is typically of sufficiently high quality for discharge in coastal, surface or brackish waterways.

As noted above, an alternative to using an acid scrubber, as in the embodiments of the system and method of the first and second aspects of the present invention described with reference to FIG. 1, ammonia may be removed from the ammonia-containing gas discharged from the ammonia stripper using a cold-water scrubber. Such a system is illustrated by FIG. 2.

Figure 2:
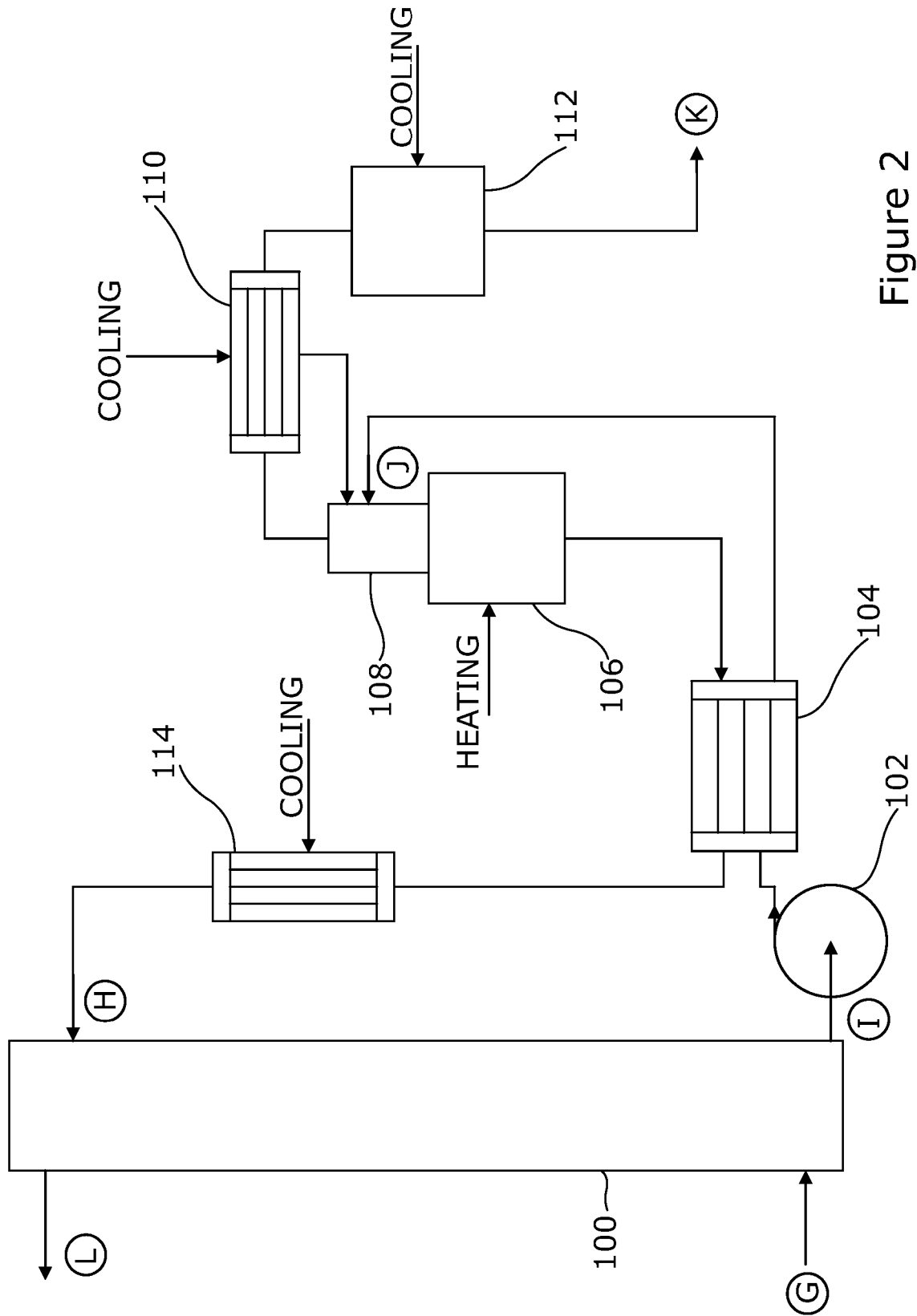
FIG. 2 shows a process flow diagram for a cold-water scrubber and ammonia removal system for use in the system and method of the third and fourth aspects of the present invention.

Thus, FIG. 2 shows a process flow diagram for a cold-water scrubber and ammonia removal system for use in the system and method of the third and fourth aspects of the present invention. The system comprises a cold-water scrubber 100, a compressor 102, a first heat exchanger 104, a generator 106 and analyzer 108, a rectifier 110, a condenser 112, and a second heat exchanger 114.

Ammonia-containing gas enters the cold-water scrubber 100 towards its lower end, as indicated by arrow G. In the scrubber 100 ammonia is collected by water entering the scrubber 100 towards its upper end, as indicated by arrow H, and leaves the scrubber 100 at the lower end as an ammonia-water solution, as indicated by arrow I. Ammonia-free air leaves the scrubber 100 towards the top, as indicated by arrow L.

The ammonia-water solution passes into the compressor 102 where it is compressed, and the compressed solution then passes through the first heat exchanger 104. The heat exchanger 104 recovers heat from water leaving the generator 106 and transfers it to the ammonia-water solution entering the analyzer 108 and generator 106. The ammonia-water solution then passes into the analyzer 108, and then the generator 106 where it is heated to remove ammonia from the solution as gas. The ammonia gas exits the generator 106 at the upper end through the analyzer 108. The analyzer 108 helps to remove water vapour from the ammonia gas. The ammonia gas then enters the rectifier 110 where it is cooled, to condense water vapour which is recycled into the analyzer 108. The ammonia gas then passes into the condenser 112, where it is condensed into liquid ammonia which is then recovered, as indicated by arrow K. Water exits the generator 106 towards the bottom, passing through the first heat exchanger 104 as described above, and then the second heat exchanger 114 where it is cooled, for reuse in the scrubber 100.

Unlike the system and method of the first and second aspects of the present invention respectively, those embodiments of the system and method of the third and fourth aspects of the present invention respectively do not use an exothermic reaction between ammonia and an acid to remove ammonia from the ammonia-containing gas, and thus the ammonia stripper 14 of the system of the third aspect of the invention will require additional means for heating and saturating air for use in the ammonia stripper. For example, the system of the third aspect of the present invention may comprise a boiler for generating steam to heat and saturate air for use in the ammonia stripper, as generally indicated by arrow B in FIG. 1, and/or a forced air source.

It will be appreciated that the specific embodiments described herein are for illustrative purposes only, and that further modifications and variations of the embodiments are possible without departing from the scope of the present invention as defined by the appended claims.

We claim:

1. A system for removing ammonia from an ammonia-containing liquid, the system comprising:
    a primary heat exchanger for heating the ammonia containing-liquid to operational temperature;
    an ammonia stripper for stripping ammonia from the ammonia-containing liquid from the primary heat exchanger and discharging it as ammonia-containing gas, the ammonia stripper comprising an ammonia-containing liquid inlet, a hot air inlet, an ammonia-containing gas outlet, and a liquid discharge outlet; and
    a cold-water scrubber for removing ammonia from the ammonia containing gas discharged from the ammonia stripper;
    wherein the cold-water scrubber removes the ammonia from the ammonia containing gas as a solution of ammonia and water, and the system further comprises a compressor for compressing the ammonia-water solution, a heater for heating the ammonia-water solution to drive off ammonia gas, and a condenser for condensing the ammonia gas as a liquid.

2. The system according to claim 1, wherein the primary heat exchanger is configured to heat the ammonia containing liquid to an operational temperature of from 70 to 90° C.

3. The system according to claim 1, further comprising a condenser for recovering heat from ammonia containing gas leaving the ammonia stripper to further heat incoming ammonia-containing liquid which is entering the system.

4. The system according to claim 3, wherein the condenser is positioned upstream of the primary heat exchanger in the incoming ammonia-containing liquid flowpath.

5. The system according to claim 1, further comprising an inlet counterflow heat exchanger for recovering heat from liquid which is being discharged from the system to heat incoming ammonia-containing liquid which is entering the system.

6. The system according to claim 5, wherein the liquid discharge outlet of the ammonia stripper is in fluid communication with the inlet counterflow heat exchanger.

7. The system according to claim 1, further comprising a boiler for generating steam to heat and saturate air for use in the ammonia stripper.

8. A method of removing ammonia from an ammonia-containing liquid, the method comprising the steps of:

stripping ammonia from the ammonia-containing liquid in an ammonia stripper using hot air, and discharging it as ammonia-containing gas;

passing the ammonia-containing gas into a cold-water scrubber to remove ammonia from the ammonia-containing gas discharged from the ammonia stripper;

removing the ammonia from the ammonia-containing gas as a solution of ammonia and water, compressing the solution, heating the solution to drive off ammonia gas, and condensing the ammonia gas as a liquid.

9. The method according to claim 8, wherein the method steps are performed using a system comprising:

a primary heat exchanger for heating the ammonia containing liquid to operational temperature; and the ammonia stripper for stripping ammonia from the ammonia-containing liquid from the primary heat exchanger and discharging it as ammonia-containing gas, the ammonia stripper comprising an ammonia-containing liquid inlet, a hot air inlet, an ammonia-containing gas outlet, and a liquid discharge outlet.

* * * * *